United States Patent
Ryland

(10) Patent No.: US 10,482,786 B2
(45) Date of Patent: Nov. 19, 2019

(54) MODULAR ROBOT SYSTEM

(71) Applicant: Barobo, Inc., Davis, CA (US)

(72) Inventor: Graham G. Ryland, West Sacramento, CA (US)

(73) Assignee: BAROBO, INC., Davis, CA (US)

( * ) Notice: Subject to any disclaimer, the term of this patent is extended or adjusted under 35 U.S.C. 154(b) by 596 days.

(21) Appl. No.: 14/772,310

(22) PCT Filed: Mar. 3, 2014

(86) PCT No.: PCT/US2014/020040
§ 371 (c)(1),
(2) Date: Sep. 2, 2015

(87) PCT Pub. No.: WO2014/137945
PCT Pub. Date: Sep. 12, 2014

(65) Prior Publication Data
US 2016/0005331 A1    Jan. 7, 2016

Related U.S. Application Data

(60) Provisional application No. 61/771,947, filed on Mar. 4, 2013.

(51) Int. Cl.
| | |
|---|---|
| *G09B 19/10* | (2006.01) |
| *B25J 9/08* | (2006.01) |
| *B25J 9/16* | (2006.01) |
| *F16H 1/12* | (2006.01) |
| *G09B 5/00* | (2006.01) |

(52) U.S. Cl.
CPC .............. *G09B 19/10* (2013.01); *B25J 9/08* (2013.01); *B25J 9/1617* (2013.01); *F16H 1/12* (2013.01); *G09B 5/00* (2013.01); *Y10S 901/02* (2013.01); *Y10S 901/09* (2013.01)

(58) Field of Classification Search
CPC . G09B 19/10; G09B 5/00; G09B 19/00; B25J 9/08; B25J 9/1617; F16H 1/12; Y10S 901/02; Y10S 901/09
See application file for complete search history.

(56) References Cited

U.S. PATENT DOCUMENTS

| | | | |
|---|---|---|---|
| 5,040,429 A | * 8/1991 | Del Castillo | ............ B25J 9/102 74/424 |
| 5,241,875 A | 9/1993 | Kochanneck | |
| 6,323,615 B1 | 11/2001 | Khairallah | |

(Continued)

FOREIGN PATENT DOCUMENTS

WO    WO 2007/062858    * 7/2007

OTHER PUBLICATIONS

European Search Report dated Jul. 5, 2017, for EP Application No. 14760080.3, six pages.

*Primary Examiner* — Timothy A Musselman
(74) *Attorney, Agent, or Firm* — Morrison & Foerster LLP

(57) ABSTRACT

A modular robot for use as an educational robot system having multiple degrees of freedom and mounting features that allow multiple modules to be assembled with accessories to form a multitude of configurations. Each module is independently mobile and useful when alone or assembled with other modules. An encoder gear and encoder gear track is used to sense multiple degrees of freedom with parallel and perpendicular axis of rotation using a single printed circuit board.

25 Claims, 16 Drawing Sheets

(56) References Cited

U.S. PATENT DOCUMENTS

| | | | |
|---|---|---|---|
| 6,686,717 B2 * | 2/2004 | Khairallah | B25J 9/08 |
| | | | 318/568.11 |
| 7,011,171 B1 * | 3/2006 | Poulter | B60B 15/023 |
| | | | 180/65.1 |
| 8,260,459 B2 * | 9/2012 | Herbert | B62D 57/02 |
| | | | 700/245 |
| 2003/0010148 A1 | 1/2003 | Okamoto et al. | |
| 2004/0182614 A1 * | 9/2004 | Wakui | B25J 5/007 |
| | | | 180/7.1 |
| 2004/0193318 A1 | 9/2004 | Ito | |
| 2008/0129239 A1 | 6/2008 | Lee et al. | |
| 2012/0204670 A1 | 8/2012 | Ryland et al. | |

* cited by examiner

MODULAR ROBOT SYSTEM

FIELD OF THE INVENTION

The present invention relates generally to a reconfigurable modular robot platform. More specifically, the present invention relates to robotic modules which may be reconfigured in multiples in an educational robotic system.

CROSS REFERENCE TO RELATED APPLICATIONS

This application is the U.S. National Stage of International Application No. PCT/US2014/020040, filed on Mar. 3, 2014, which claims the benefit of earlier filed U.S. Provisional Application Ser. No. 61/771,947, entitled MODULAR ROBOT SYSTEM, filed on Mar. 4, 2013, the entire contents of which are incorporated herein by reference for all purposes.

BACKGROUND OF THE INVENTION

A drawback that inhibits wide adoption of robotics in the classroom is the lack of hardware adaptable to a wide range of curriculum, which is still physically manageable in a typical classroom setting.

Construction kits that disassemble into hundreds of small components are not practical for teaching a classroom of students, relegating robotics to small, after-school groups. Although educational toys are becoming more popular, they offer limited programmability and are bounded by their lack of hardware customizability.

Also, a drawback to current encoding methods and apparatus used in robot and automation applications is the necessity of multiple, dedicated, printed circuit boards to encode each motor in the robot.

Provision of encoding for motors is inhibited primarily by cost: Such equipment is expensive, typically needing significant physical space in the system and customized printed circuit boards for each motor in the robot.

U.S. Pat. No. 6,605,914 to Yim et al., titled "ROBOTIC TOY MODULAR SYSTEM" shows a modular robot which assembles together with other modules. Modules sense the attachment location of other modules, defining the configuration of the assembly of robots. Several accessories are also described. This robot is made up of a single degree of freedom driven by a servo motor. Servo's typically do not rotate continuously, and those which have been modified to rotate continuously lose the angular sensing capabilities. A single module of this design is not independently mobile, meaning multiple modules must be assembled together in order for the robot to be mobile or achieve basic functionality.

U.S. Pat. No. 7,013,750 to Kazami et al., titled "UNIT SET FOR ROBOT" shows a unit for constructing a robot with a specific surface profile for the housing having fixed and rotating joints with several accessories described. This modular robot design has two degrees of freedom with axis of rotation which are perpendicular and intersect. There is a limitation to the configurations possible with only this configuration. A single module of this design is not independently mobile, meaning multiple modules must be assembled together in order for the robot to be mobile or achieve basic functionality. Although there are some features on the body for improving stability when attached to another module it's not possible to attach accessories to the body itself, limiting functionality.

U.S. Pat. No. 8,175,747 to Lee et al., titled "JOINABLE ROBOT COMPONENT FOR ROBOT TOY, MODIFIABLE ROBOT TOY USING THE JOINABLE ROBOT COMPONENTS, AND CONTROL METHOD THEREOF" shows a toy which can be assembled with accessories to form various configurations. A single module of this design is not independently mobile, meaning multiple modules must be assembled together in order for the robot to be mobile or achieve basic functionality.

U.S. Pat. No. 6,084,373 to Goldenberg et al., titled "RECONFIGURABLE MODULAR JOINT AND ROBOTS PRODUCED THEREFROM", discloses a reconfigurable modular drive joint which can be set up in a roll, pitch, or yaw configuration. A single module of this design is not independently mobile, meaning multiple modules must be assembled together in order for the robot to be mobile or achieve basic functionality.

U.S. Pat. No. 7,747,352 to Raffle et al., titled "PHYSICAL MODELING SYSTEM FOR CONSTRUCTING AND CONTROLLING ARTICULATED FORMS WITH MOTORIZED JOINTS", discloses a single degree of freedom modular robot and accessories that allow it to be assembled into various configurations. A single module of this design is not independently mobile, meaning multiple modules must be assembled together in order for the robot to be mobile or achieve basic functionality.

U.S. Pat. No. 6,323,615 to Khairallah et al., titled "MODULAR ARTICULATED ROBOT STRUCTURE", discloses a modular articulated robot structure. Each module has a single degree of freedom with limited rotation, not allowing for continuous rotation of each joint when modules are assembled. Having module with a single degree of freedom which cannot rotate continuously limits the robot to arm applications and overall mobility to crawling/walking locomotion. In order for the robot to drive as though with wheels for any significant distance it would need a continually rotating degree of freedom. A single module of this design is not independently mobile, meaning multiple modules must be assembled together in order for the robot to be mobile or achieve basic functionality.

U.S. Pat. No. 6,686,717 to Khairallah et al., titled "MODULAR ARTICULATED STRUCTURE", discloses additional details regarding a modular articulated robot structure. A riding disc is described for a configuration of this robot, adding a second degree of freedom in the form of a wheel shaped attachment to the end of a module. This configuration is specifically meant for driving with a wheel, but not specifically for attaching to other modules or accessories, limiting functionality. A single module of this design is not independently mobile, meaning multiple modules must be assembled together in order for the robot to be mobile or achieve basic functionality.

Publication No. EP2531327 to Ryland et al., titled "FOUR DEGREE OF FREEDOM (4-DOF) SINGLE MODULE ROBOT UNIT OR JOINT", discloses a modular robot which is made up of a center section, two outer sections and two faceplates where the outer sections rotate 180 degrees in reference to the center section and the faceplates rotate continuously in reference to the outer section.

SUMMARY OF THE INVENTION

The present invention relates generally to a reconfigurable modular robot platform. More specifically, the present invention relates to robotic modules which may be reconfigured in multiples in an educational robotic system.

Modular robots are made up of individual modules which are typically simple in form and capability. Modules can be assembled, connecting together mechanically to form complex robots, or clusters. They can be reconfigured in radically different ways to best suit the desired application, giving them versatility unmatched by application specific robots.

Presently, teachers wishing to use robots for Science Technology, Engineering, and Math curriculum do not have a turn-key option which is suitable for the classroom environment. Although the Lego Mindstorms and Vex construction kits are extremely flexible they're also difficult to manage with multiple kids in a busy classroom environment. These construction kits typically have over 500 parts, which means students require close supervision to stay on task, not mix kits, or loose parts. Also, the time and effort required between pulling a construction kit out of the box to getting having a robot that moves in an engaging way is great. There is a steep learning curve that needs to be overcome before it becomes a fun experience for students. Also, these kits are closed source, meaning it's not possible to modify parts or create new parts that interface with the kit.

There are wheeled educational robots which are useful for specific curriculum, but their capabilities are limited by their hardware capabilities. Typically these robots are expensive and only have one or two applications, which equates to low teaching value for the cost per student.

There is a need to provide an educational robot platform that is highly adaptable to a wide array of curriculum and is manageable in a busy classroom environment.

Additionally, there is a need to provide an educational construction kit which has large components that are easily manageable and not easily lost or mixed up.

Further, there is a need for an educational robot which enables social interaction between students by allowing robots to be quickly and easily shared and assembled together to form more complex robots to achieve goals set out in curriculum and competitions. In this way modular robots foster 21st century skills like collaboration, creativity and problem solving.

Herein, the term "module" refers to a robot having multiple degrees of freedom and is assembleable with accessories and other modules.

Herein, the term "D-shaped housing" refers to the shape of the exterior body of the module which has a D-shaped side profile.

Herein, the term "degree of freedom" refers to an independently controlled hub which rotates in both directions in reference to the D-shaped housing.

Herein, the term "hub" refers to a component which is driven by a gearmotor and rotates in reference to the D-shaped housing having a mounting feature facing exterior of the module.

Herein, the term "fixed hub" refers to a component which can be substituted in the rotating hub location, but is fixed to the D-shaped housing, having the same mounting feature facing the exterior of the module as a hub.

Herein, the term "mounting feature" refers to a method of fastening to a surface, releasably or permanently, using screws, snap connectors or any other fastening method.

Herein, the term "controller" refers to a electronic device located on the robot which can come loaded with a program, or be programmed by an external device such as a computer, tablet or smartphone. The control can be programmed through an electrical connection or wireless communication such as Bluetooth or ZigBee. The controller can receive and execute commands through an electrical connection or wirelessly for remote control.

Herein, the term "battery" refers to a power source capable of powering the controller and gear motors of the system.

Herein, the term "gearmotor" refers to an actuator that is connected to a pivot mechanism to supply operational power for rotation.

Herein, the term "connector plate" refers to a component which is capable of permanently or temporarily fastening to the mounting feature, whether using hooks, snap features, screws, or any other fastening method.

Herein, the term "bridge plate" refers to a component which connects two modules together in a way other than hub to hub. Bridge plates can have multiple mounting features distributed in multiple configurations and at various angles depending on the desired application.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
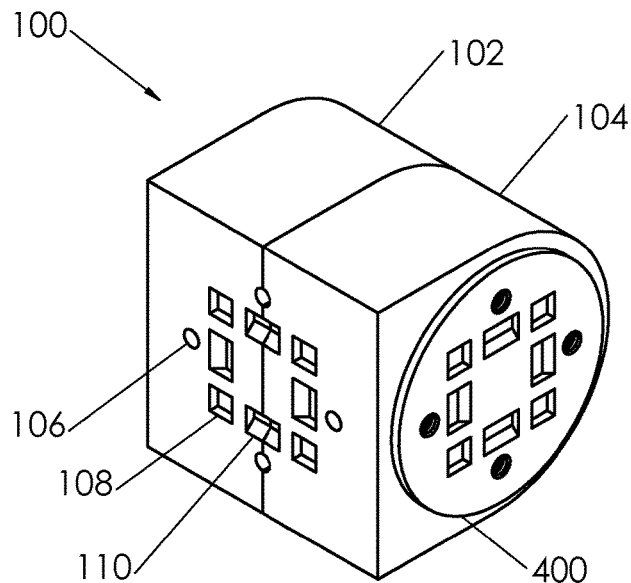
FIG. 1 is a perspective view of one example embodiment of a robotic module having two degrees of freedom with parallel axis of rotation.

FIG. 1 shows one embodiment of the robotic module 100 of the present invention. A housing consisting of 102 and 104, which may be comprised of any numerous known plastic materials. The materials used in the housing and other parts may be made from injection molded plastic or other materials such as sheet-cut or molded plastic, metal, paperboard, or wood. There is a mounting feature formed into the front face of the housing shown in this embodiment as being made up of four threaded holes 106, four slots 108, and four indentations 110. The four threaded holes 106 are designed to receive a #6-32 screw for releasably fixing accessories. The slots 108 and indentations 110 are designed to mate with a connector plate 1302, described later. This connector plate allows modules to quickly snap together while taking up very little space between modules. This mounting feature is also present on the hub 400.

Figure 2:
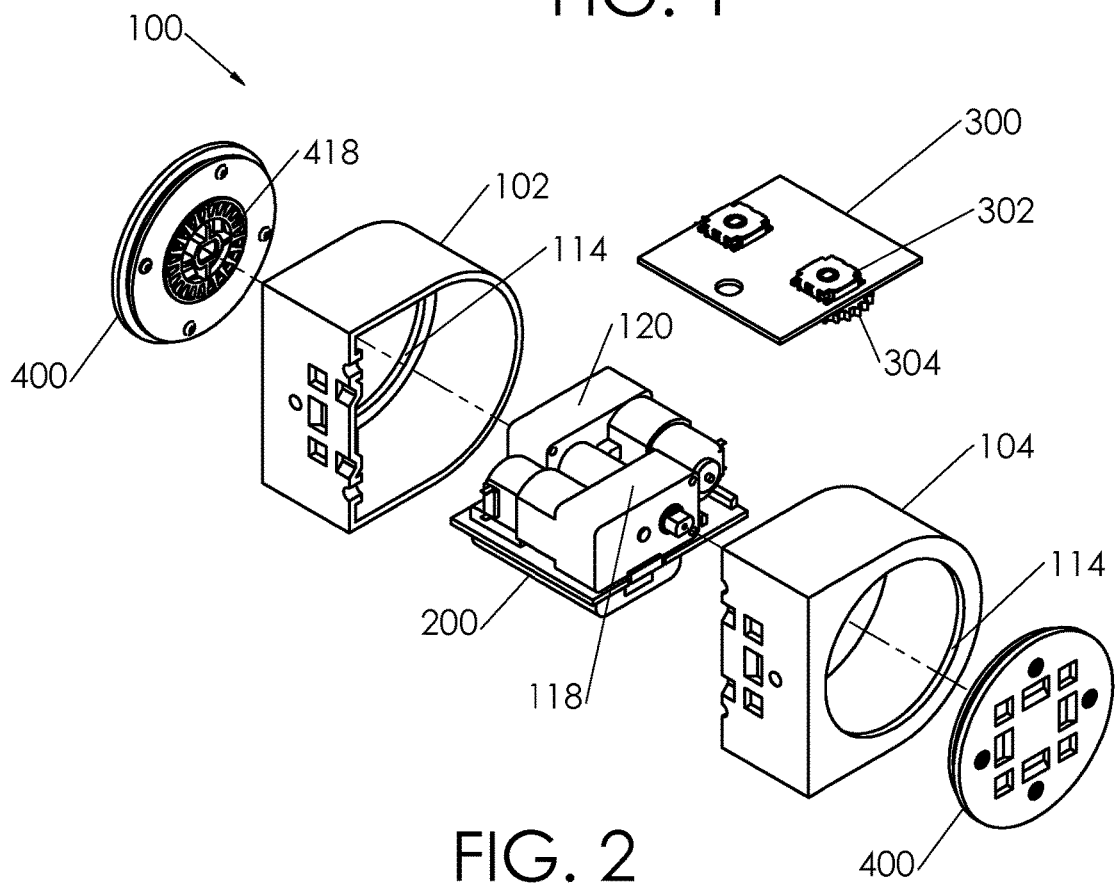
FIG. 2 is a disassembled perspective view of one example embodiment for a robotic module having two degrees of freedom with parallel axis of rotation.

FIG. 2 shows a disassembled perspective view of a two degree of freedom module with parallel axis of rotation showing a drive unit 200 a controller unit 300 and two hubs 400. The controller unit has two encoders 302 with an encoder gear 304 that mates with the encoder track 418 on the back of the hub 400. The encoder gear floats between the printed circuit board 306 and the top surface of the motor 202 shown as surface 118 and 120. This offers support for the encoder gear ensuring that it stays aligned and correctly engaged with the encoder gear track 418. The hubs 400 are shown assembled, however, in order for them to interface with the housings they need to be assembled around the housing so the housing wall 114 runs along the track formed by the front of the hub 402 and the back 408, described in more detail in FIG. 5. The hubs are made of a dissimilar material from the housings in order to aid in smooth rotation. For this embodiment the housings are made from ABS and the hub front and back from Delrin, which provides a low friction interface. Motor 202 is a brushed DC motor with plastic gearing and offset output available from Pololu.com, item number 1118.

Figure 3:
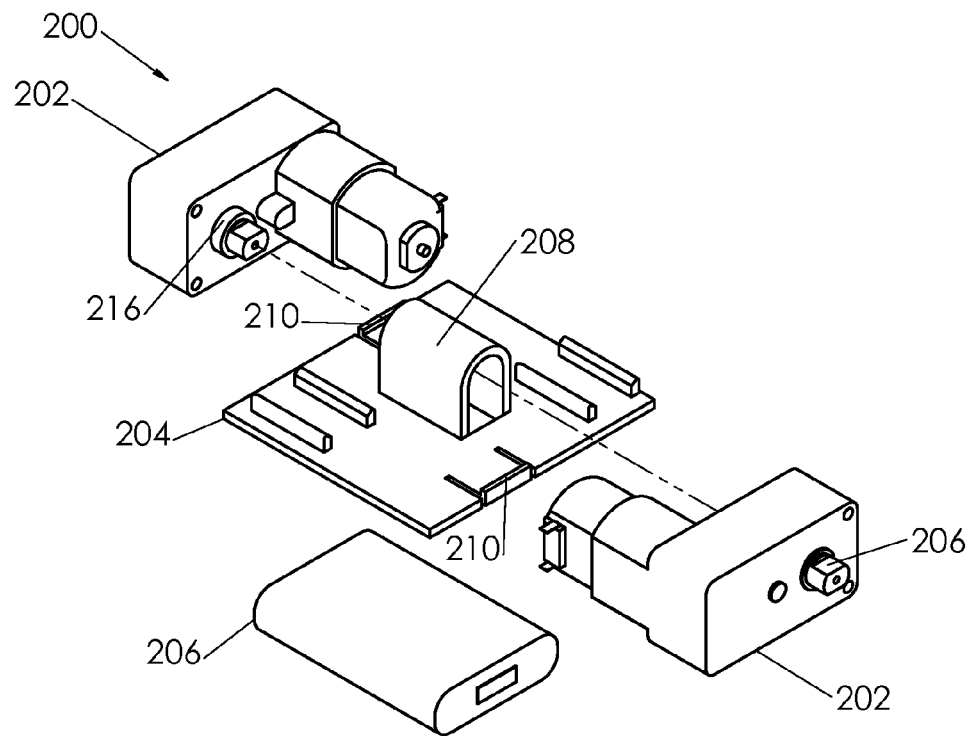
FIG. 3 is a disassembled perspective view of the drive unit of one example embodiment having two degrees of freedom with parallel axis of rotation.

FIG. 3 shows a disassembled perspective view of a two degree of freedom module showing a drive unit 200. Two motors 202 attach to the motor carrier 204. The non-rotating ledge of the motor 216 engages with the hoop 208 and snaps into place with features 210. A battery 206 attaches to the underside of the motor carrier 204 using double sided tape.

Figure 4:
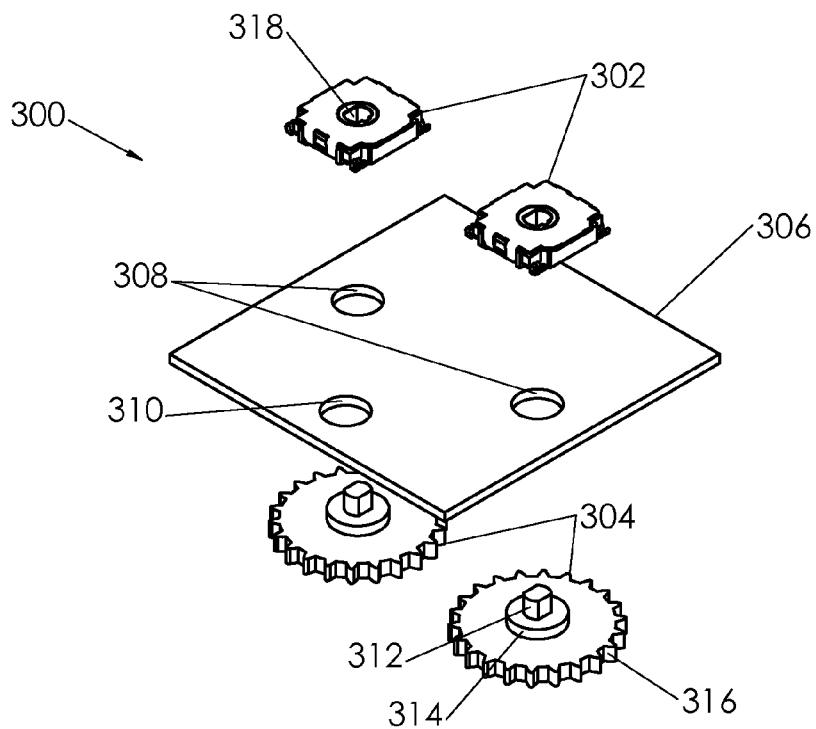
FIG. 4 is a disassembled perspective view of the controller unit of one example embodiment having two degrees of freedom with parallel axis of rotation.

FIG. 4 depicts one exemplary embodiment of controller unit 300 with printed circuit board 306, two encoders 302 and encoder gears 304. The encoder gear 304 has a shaft 312 which mates with the encoder gear hole 318. The rounded feature 314 of the encoder gear fits inside 308 helping to center it. The encoder gear teeth 316 match up with the encoder gear track 418 shown in FIG. 6. The hole 310 is not populated with an encoder or encoder gear because this printed circuit board is currently configured for a module with two hubs with parallel axis of rotation. This printed circuit board can be used for a module with hubs collinear or perpendicular, shown in later figures. Also, in one exemplary embodiment, a single controller unit 300, or even one printed circuit board, can be used to encode and drive multiple degrees of freedom.

Figure 5:
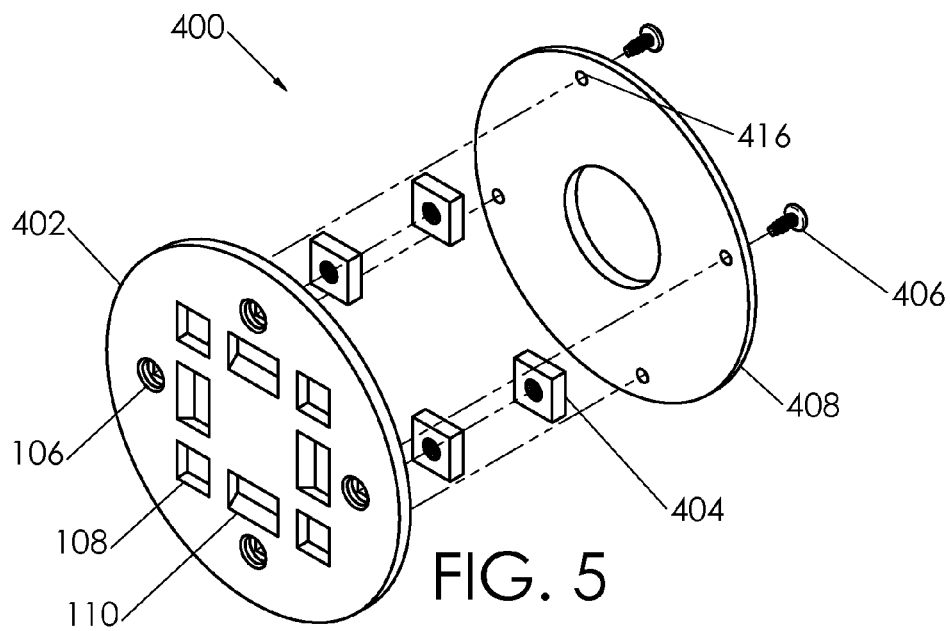
FIG. 5 is a disassembled perspective view of the hub of one example embodiment having two degrees of freedom with parallel axis of rotation.

FIG. 5 shows a hub having a front half 402 which faces toward the outside of the module and a back half 408 facing toward the inside of the module. 402 has a mounting feature consisting of four threaded holes 106, four slots 108 and four indents 110. Four square nuts 404 provide a metal thread for the four screw holes 106. The nuts are sandwiched between 402 and 408. The four screws 406 pass through four holes 416 in 408 and mount to the back of 402 to hold the assembly together.

Figure 6:
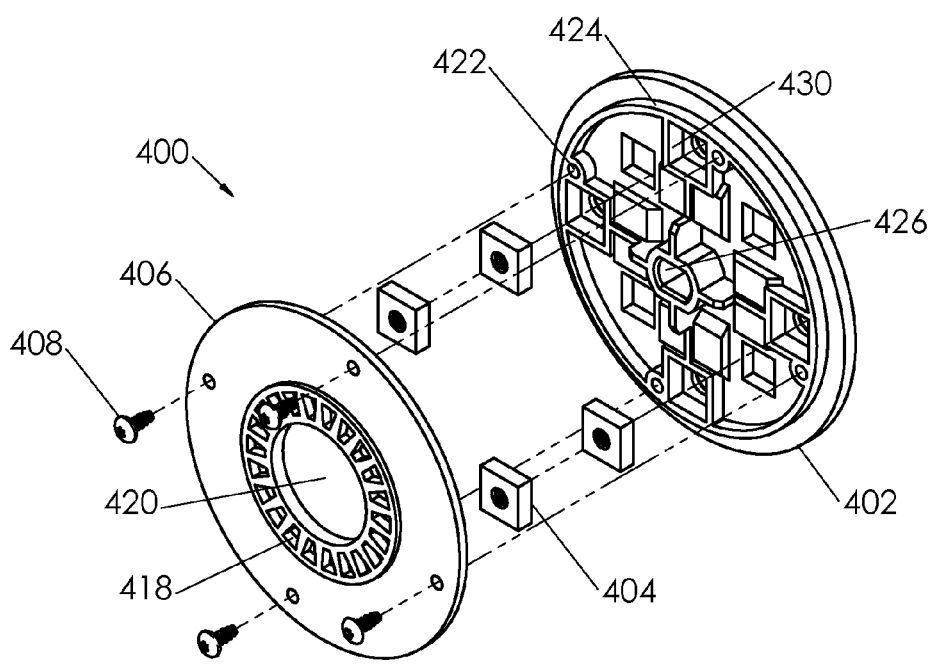
FIG. 6 is a disassembled perspective view of the hub of one example embodiment having two degrees of freedom with parallel axis of rotation.

FIG. 6 is the same assembly as FIG. 5, but from another angle, exposing the rear features of 402 and 406. The step 424 creates the groove which the D-shaped housing features 114 run along, acting like a bearing for axial, rotary and torsional forces. Feature 430 in the back of 402 receives the square nut 404. The encoder track 418 is concentric to the hub and mates with encoder gear 304. There are an equal number of female slots on the track 418 as there are male teeth on the encoder gear 304. The center of the hub has a feature 426 which mates with the hub of the gearmotor drive shaft 206. This feature 426 protrudes through the hole 420 in the back half 406. Finally, four screws 408 mount in feature 422.

Figure 7:
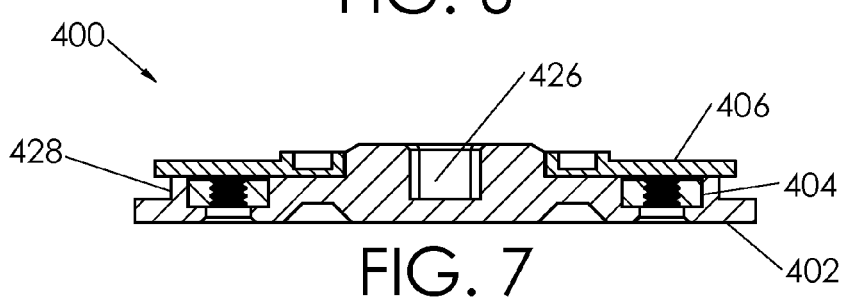
FIG. 7 is a cross sectional view of the hub of one example embodiment having two degrees of freedom with parallel axis of rotation.

FIG. 7 shows a cutaway view of the hub 400 where the slot formed by the front 402 and back 406 half of the hub forms a slot which engages with hole features 114 in the D-shaped housing. This view also shows clearly that the shaft mating feature 426 extends past the encoder track. Also, the nut 404 is sandwiched between the two halves.

Figure 8:
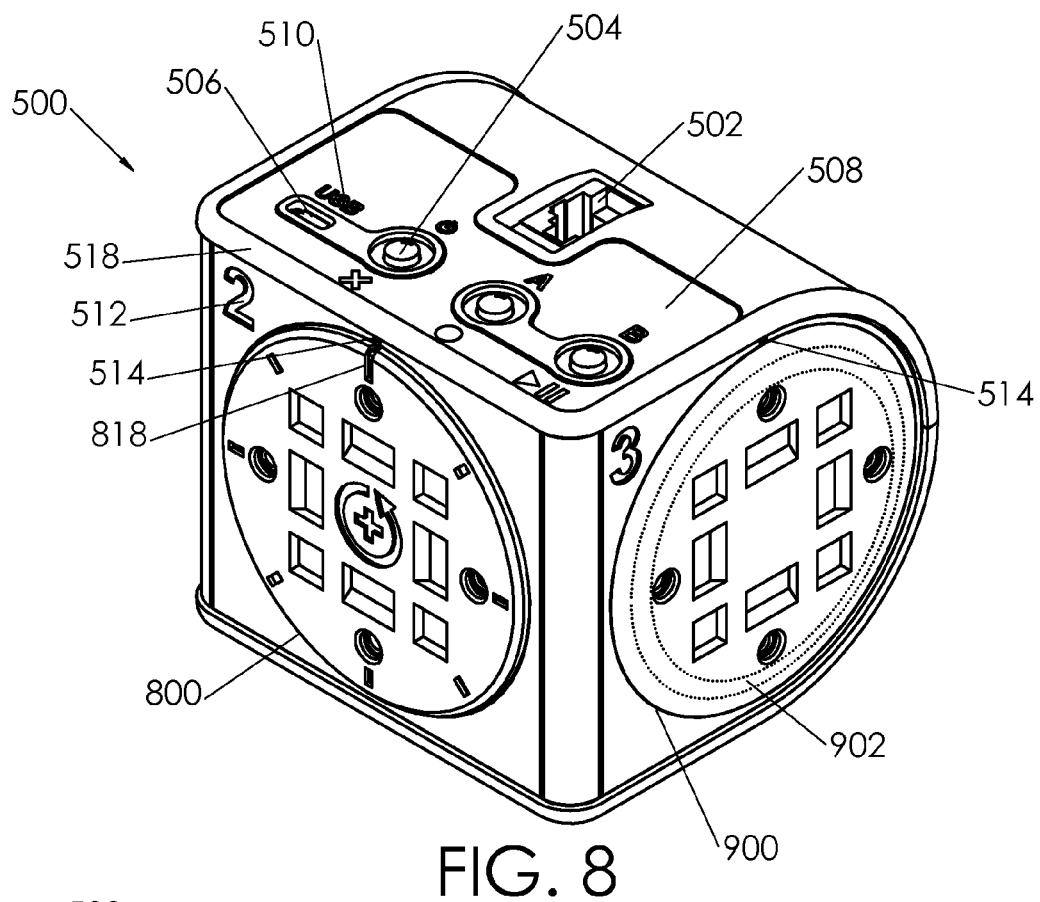
FIG. 8 is a perspective view of one embodiment of a robotic module having two degrees of freedom with perpendicular axis of rotation.

FIG. 8 shows an embodiment of the module where the hub axes are perpendicular and introduces the concept of a fixed hub. This configuration has a hole in the housing which has a connector 502. This connector offers an I2C buss to power and control accessories such as range finders, tactile switches, or whatever the user desired. The plug is shown here as a standard phone jack. There are also holes in the housing for three buttons 504 for user interface. There's also a sticker 508 on the housing with graphics 510 showing the use of each button. The module is recharged and can be programmed or controlled using a USB plug 506 and there is a hole in the housing to allow access. The sides of the housing are numbered 512 to identify the hub locations to make it easier to identify orientation for programming. There is a marker 514 on the housing which shows the vertical position for the hub vertical indicator 818. These two features are used to help align the hub when calibrating the zero location of the robot. A rounded ridge 518 runs along the outer rim of the housing and protrudes out to help protect the body surface finish, buttons and plugs from wear and tear of standard operation. The fixed hub 900 curves inward, shown by dotted lines 902, and mates flush with the housing. Fixed hub 900 is meant to blend in to the housing whereas hub 800 stands out by protruding from the housing and being a dissimilar color, texture and material to help it stand out as a moving element.

Figure 9:
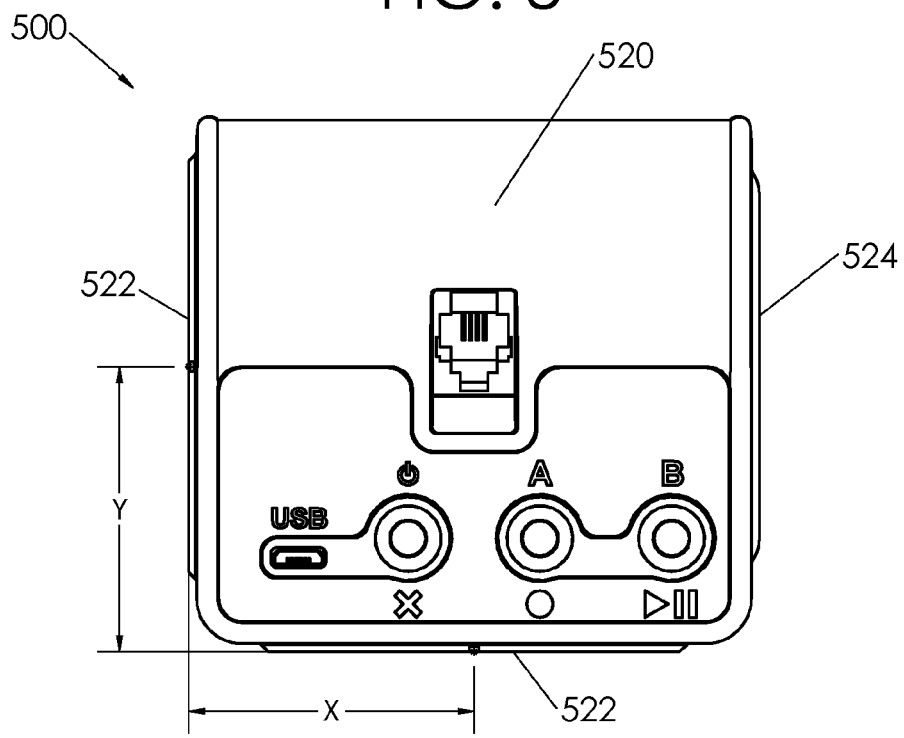
FIG. 9 is a top view of one embodiment of the robotic module having two degrees of freedom with perpendicular axis of rotation.

FIG. 9 is a top down view of 500 which shows the symmetry of hub 522 and fixed hub 524. Even though the fixed hub does not rotate it has the same mounting features and surface location of that of a hub to help symmetry when assembling. In this embodiment X and Y are equal, which also improves symmetry when assembling. However, it is not required to have symmetry to successfully assemble with other modules or accessories. The housing is translucent and a multicolor LED 724 lights up the internal surface of the housing causing the module to glow, emanating approximately from the location of 520.

Figure 10:
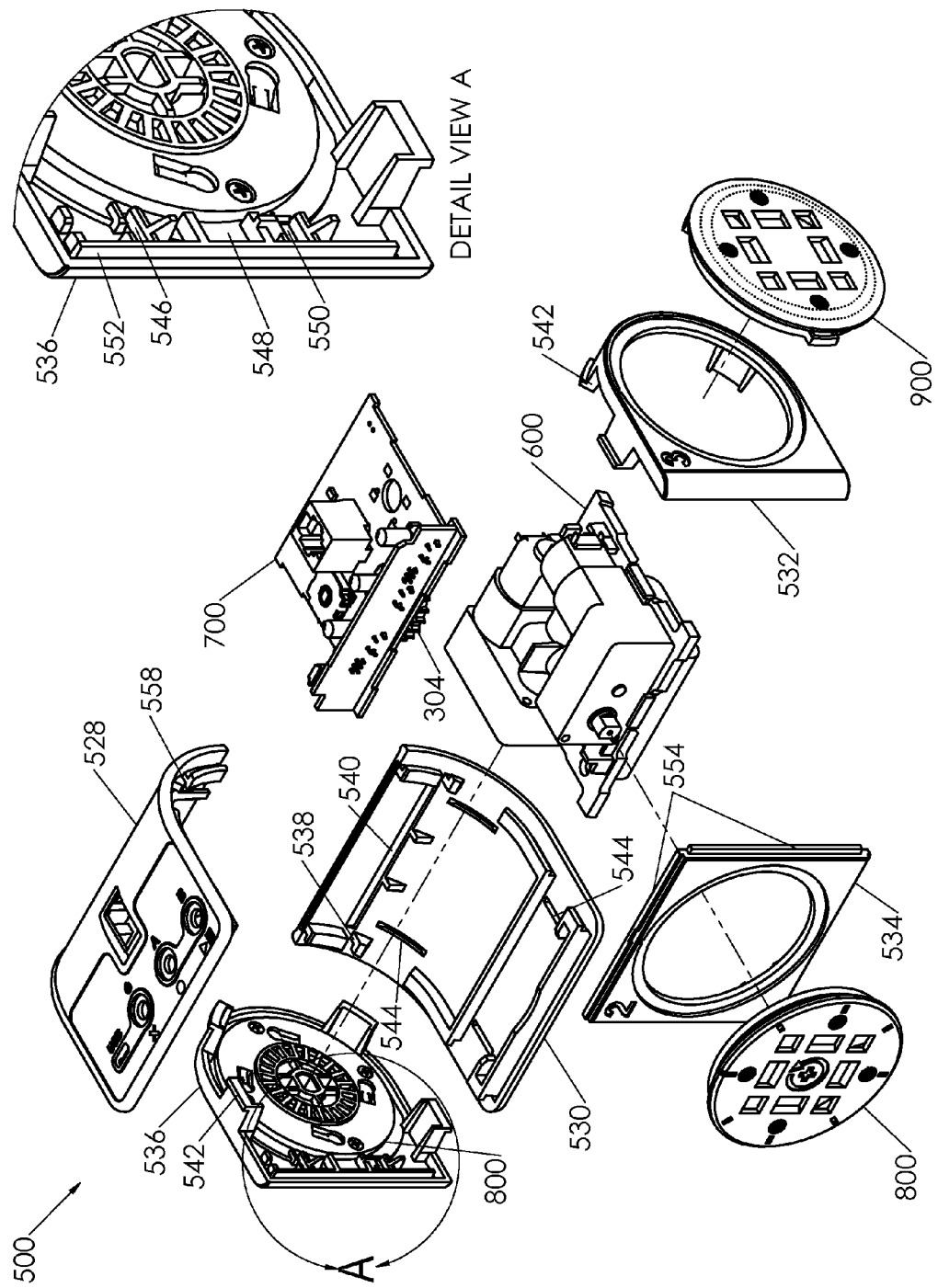
FIG. 10 is a disassembled perspective view of one example embodiment for a robotic module having two degrees of freedom with perpendicular axis of rotation.

FIG. 10 is a disassembled view of 500 showing a drive unit 600, controller unit 700, hub 800, fixed hub 900 and housing components. The housing for this embodiment is made up of five components which snap together. The top 528 and bottom snap into the sides 532 and 536 using the snap features 542 and 544. Sides 532 and 536 are mirror images of each other. The front housing 534 has a lip 554 extending out along its edges which fits in the groove 552 of the side housing components as well as a groove in the top and bottom housing components. The features 720 of the controller unit 700 fits into the mounting feature 546 in the side housing components, and feature 722 fits in slot 558 of the top housing 528. The feature 620 of the drive unit 600 fit into the mounting feature 550 of the side housing components, and feature 622 fits in slot 538 of the bottom housing 530. The feature 548 shows one of three features where the fixed hub tabs 910 mount to the side housing 532.

Figure 11:
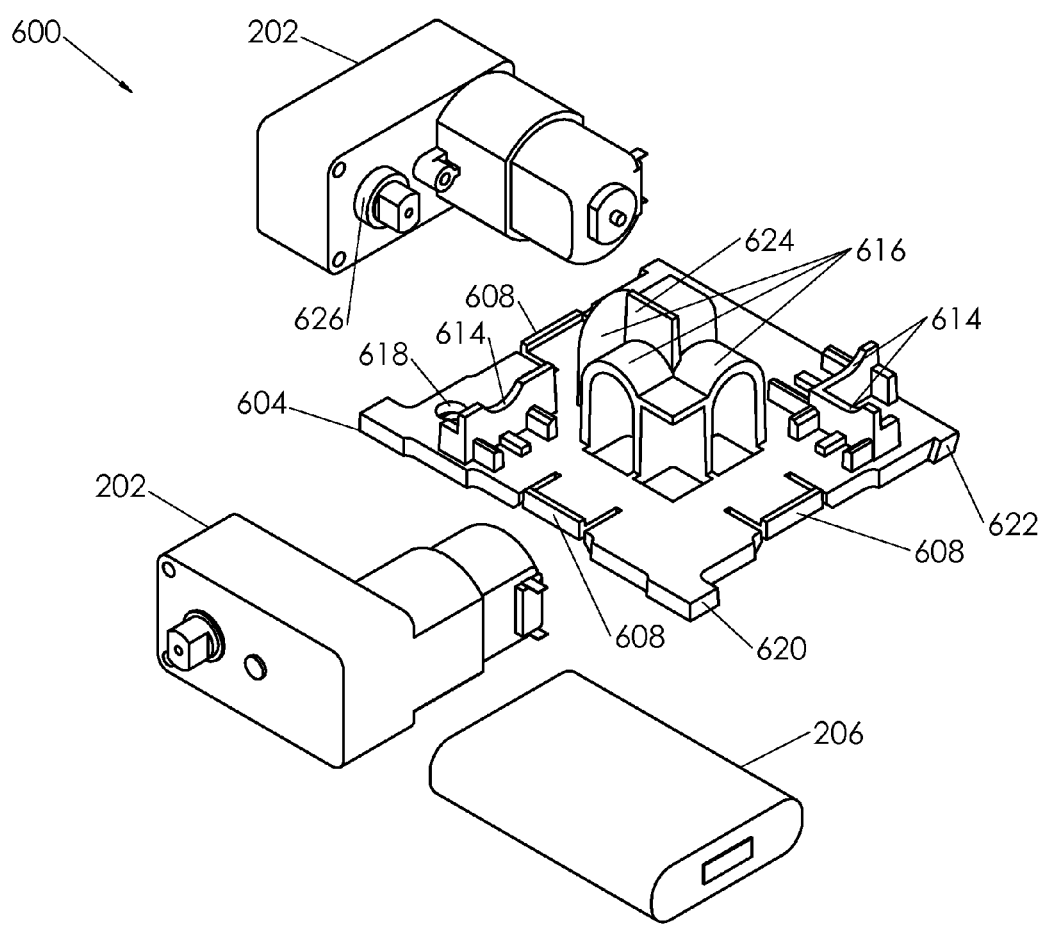
FIG. 11 is a disassembled perspective view of the drive unit of one example embodiment having two degrees of freedom with perpendicular axis of rotation.

FIG. 11 shows a disassembled view of the drive unit 600 where two motors 202 are mated with the carrier 604. This drive unit design accommodates both the parallel and perpendicular axis of rotation configuration of the module. The gearmotor 202 body feature 626 mates with motor carrier feature 616, while the rest of the gearmotor interfaces with feature 614. A snap feature 608 secure the motor. The battery 206 is affixed to the bottom of the carrier with double sided tape or epoxy. Feature 620 mates with feature 550 of the housing 536 and 622 mates with feature 538 and 540 of the module housing 530 to mount the carrier. The vertical tab 624 pushes against the bottom of the controller unit 700 to support it when the user pushes a plug into 502.

Figure 12:
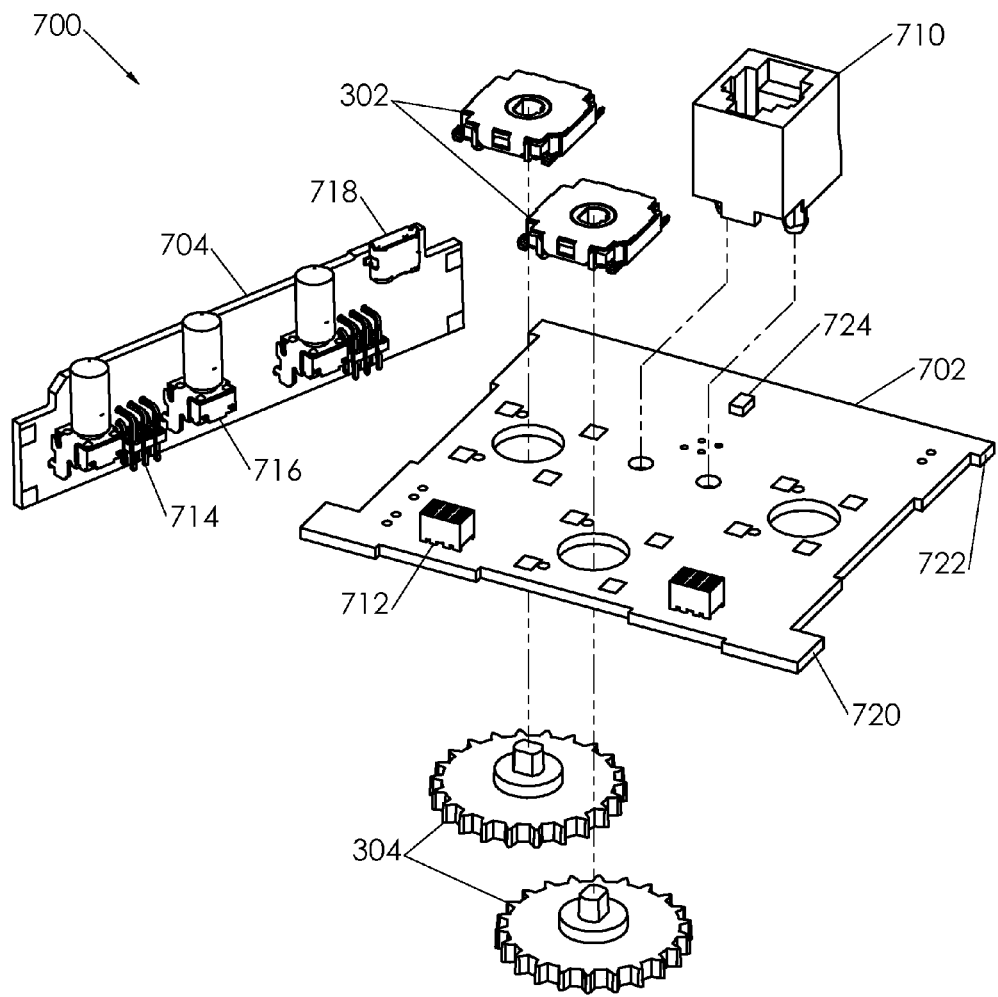
FIG. 12 is a disassembled perspective view of the controller unit of one example embodiment having two degrees of freedom with perpendicular axis of rotation.

FIG. 12 shows a disassembled view of the controller unit 700, which is split into two boards, 702 and 704. The encoders 302 and encoder gears 304 are in the perpendicular axis of rotation configuration. The standard phone jack connector 710 is used for I2C communication with accessories and protrudes through the housing. Two sockets 712 mate with pins 714 making an electrical connection between boards and offering some mechanical stability. There are three buttons 716 on the vertical board as well as a USB plug 718. A multicolor LED is located on the main board 724. The main board 702 has features 722 and 720 which mate with the housing of the robot.

Figure 13:
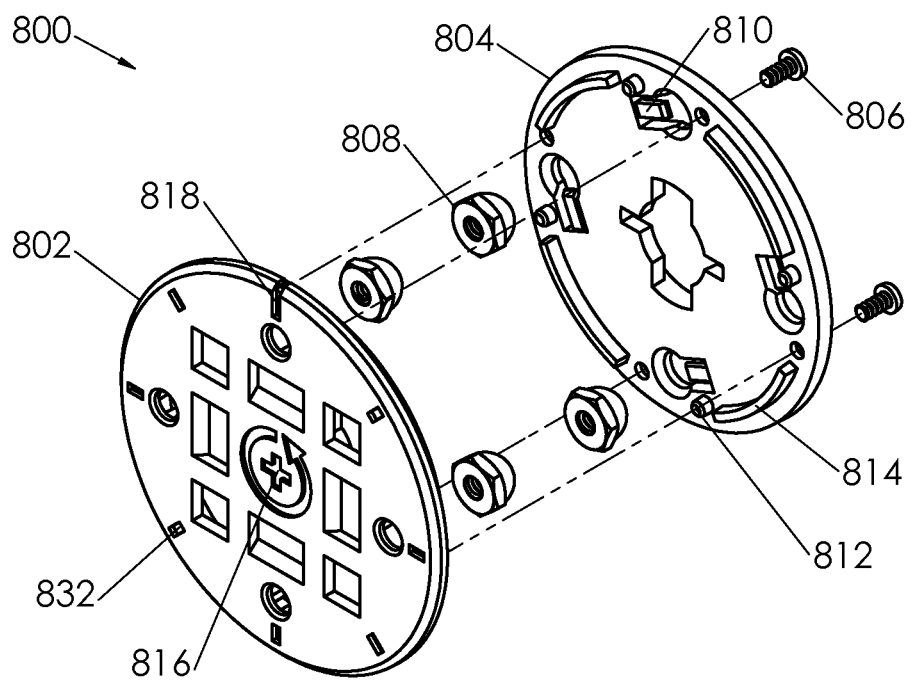
FIG. 13 is a disassembled perspective view of one example embodiment of the hub.

FIG. 13 shows a disassembled view of the hub made up of a front half 802 which faces outward and a back half 804 which faces inward to the module and are assembled with four screws 806. The square nuts of the previous embodiment are replaced with acorn nuts 808 because they have a blind threaded hole. If a screw was inserted into the square nut and torqued down hard it could damage the internal structure of the hub or module. An acorn nut provides a blind threaded hole. There is a finger 810 which extends from the back half of the hub 804 which and touches the top of the nut to stop it from rattling, while still offering clearance needed for manufacturing tolerance stack-up. Four tabs 812 mate with feature 822 of FIG. 14 to help center the two halves of the hub and keep them from rotating apart from each other. In a similar way, feature 814 helps keep the two halves of the hub concentric when they mate with the outer half 802. There is a marking 816 in the center of the hub that defines the positive direction of rotation to the user. The direction is right-hand-rule and the same for all hubs. A marker 818 shows the zero location of the hub. There are also marks 832 in 45 degree increments.

Figure 14:
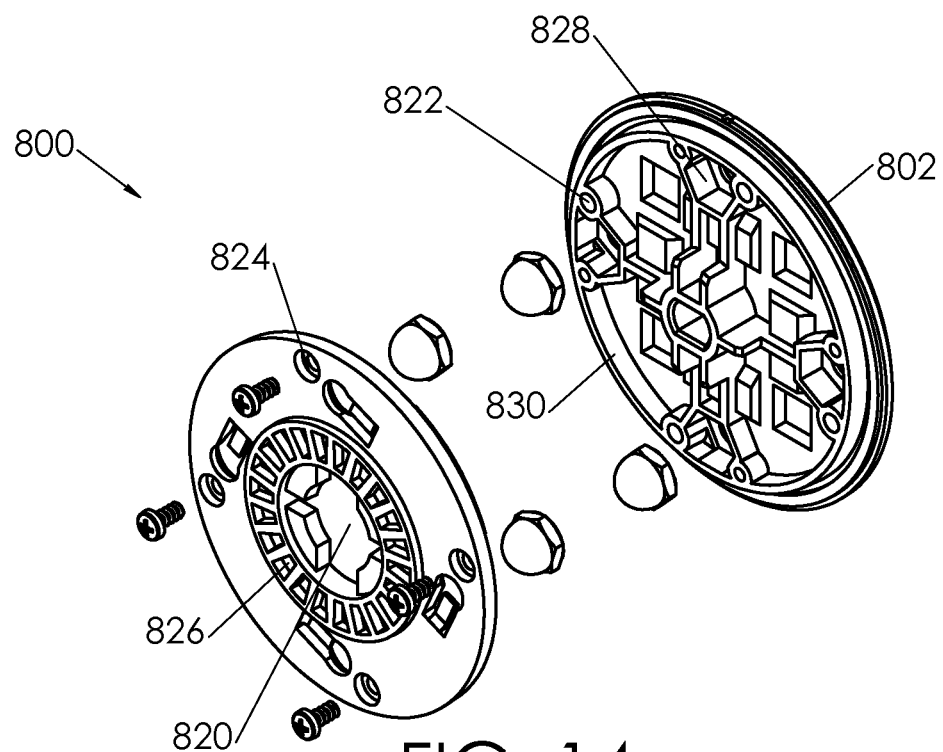
FIG. 14 is a disassembled perspective view of one example embodiment of the hub.

FIG. 14 is the same embodiment as FIG. 13, but from another angle showing the underside of 802 and 804. You can see where the tab 812 mates with the hub at 822 and the rounded feature 814 with the internal edge 830. The encoder gear track 826 is concentric with the hub. Also, the mounting location 828 for the acorn nut 808 is hexagonal in the hub front. Finally, there is a hole 820 where the hub front 802 protrudes through hub back 804.

Figure 15:
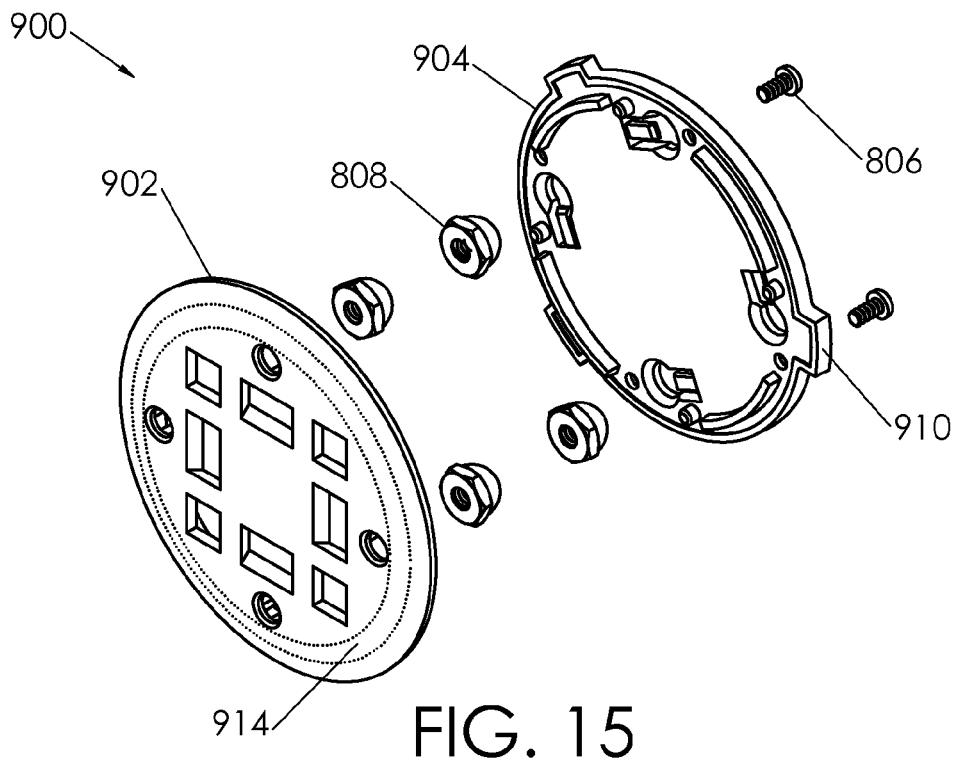
FIG. 15 is a disassembled perspective view of one example embodiment of the fixed hub.

FIG. 15 shows a disassembled view of the fixed hub which is made up of a front half 902 and back half 904. The back half has three tabs 910 which extend out from the circular profile to mate with the housing features 548. The profile of 902 curves down, shown in dotted lines 914, from the mounting feature plane to a narrow edge which mates with the housing having a minimal seam. Four screws 806 mount the two halves together sandwiching four nuts 808 inside.

Figure 16:
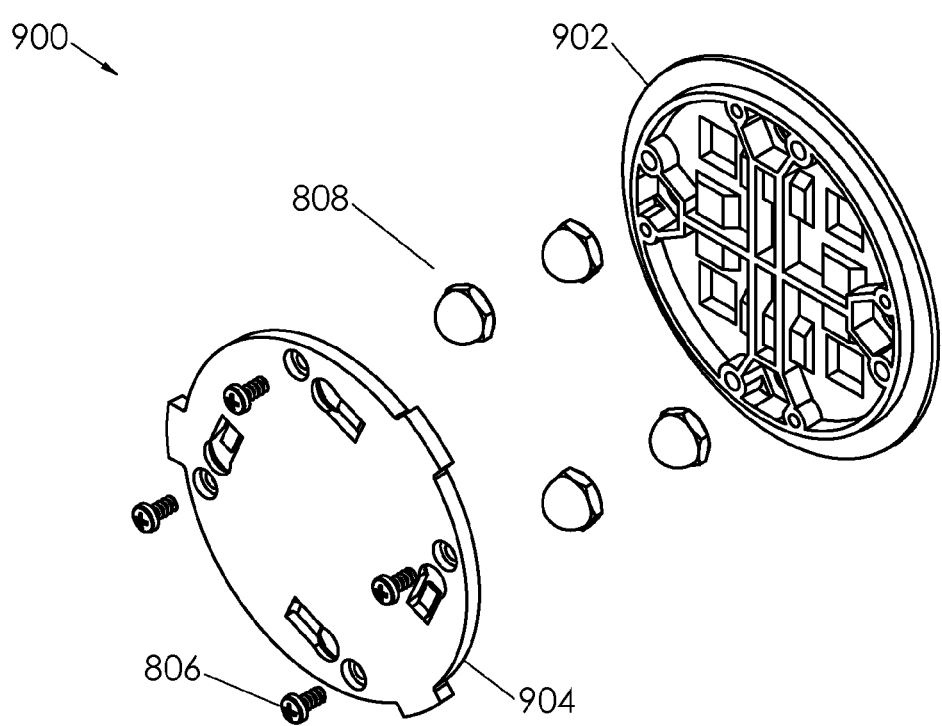
FIG. 16 is a disassembled perspective view of one example embodiment of the fixed hub.

FIG. 16 is the same embodiment as FIG. 15, but from a different angle that shows that there is no mounting feature for the motor drive shaft 206. Also, there is no encoder gear track on 904.

Figure 17:
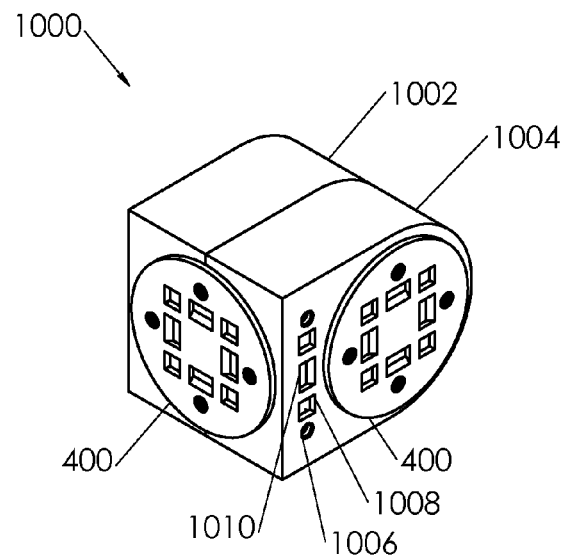
FIG. 17 is a perspective view of one embodiment of invention robotic module having three degrees of freedom.

FIG. 17 shows an embodiment of a three degree of freedom module having three hubs 400. The D-shaped housing is made up of two halves, 1002. There are also mounting features formed into the housing, two threaded holes 1006, two slots 1008 and one indent 1010. The third hub 400 is not visible on the far side of the module.

Figure 18:
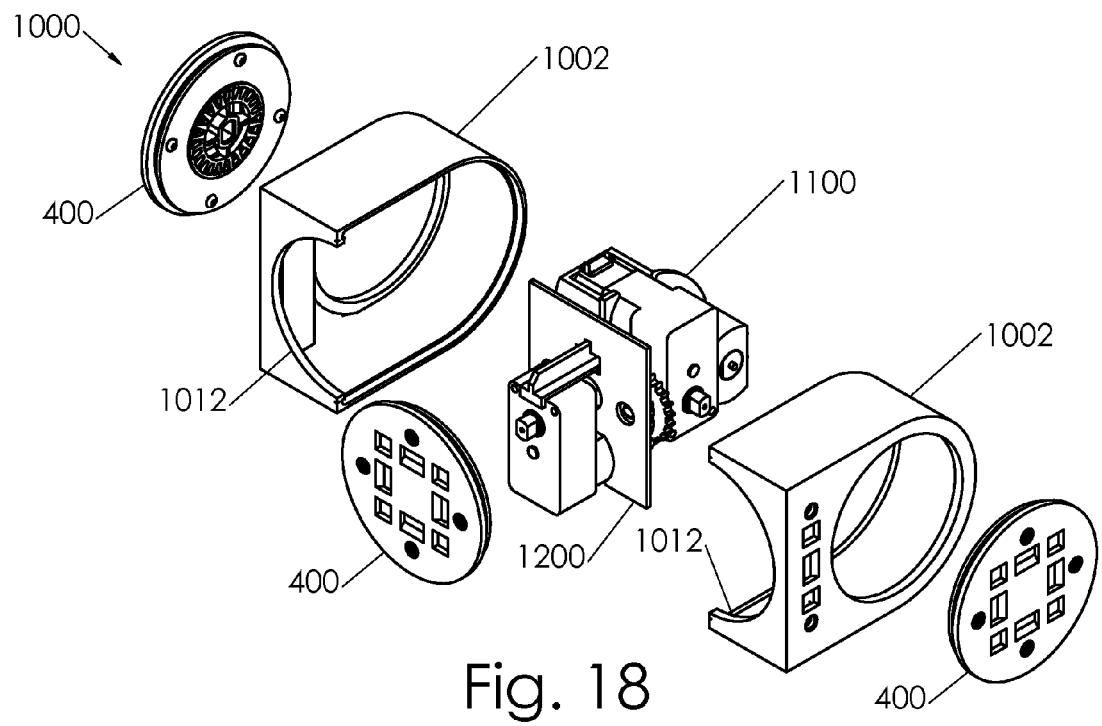
FIG. 18 is a disassembled perspective view of one example embodiment for a robotic module having three degrees of freedom.

FIG. 18 shows a disassembled view of the three degree of freedom module. Again, the hubs 400 are shown assembled, but they would instead sandwich the hole features in 1002 for operation. For the front hub 400 there is a partial hole 1012 in each of the housing halves for the hub to mount. A drive unit 1100 and controller unit 1200 are also shown.

Figure 19:
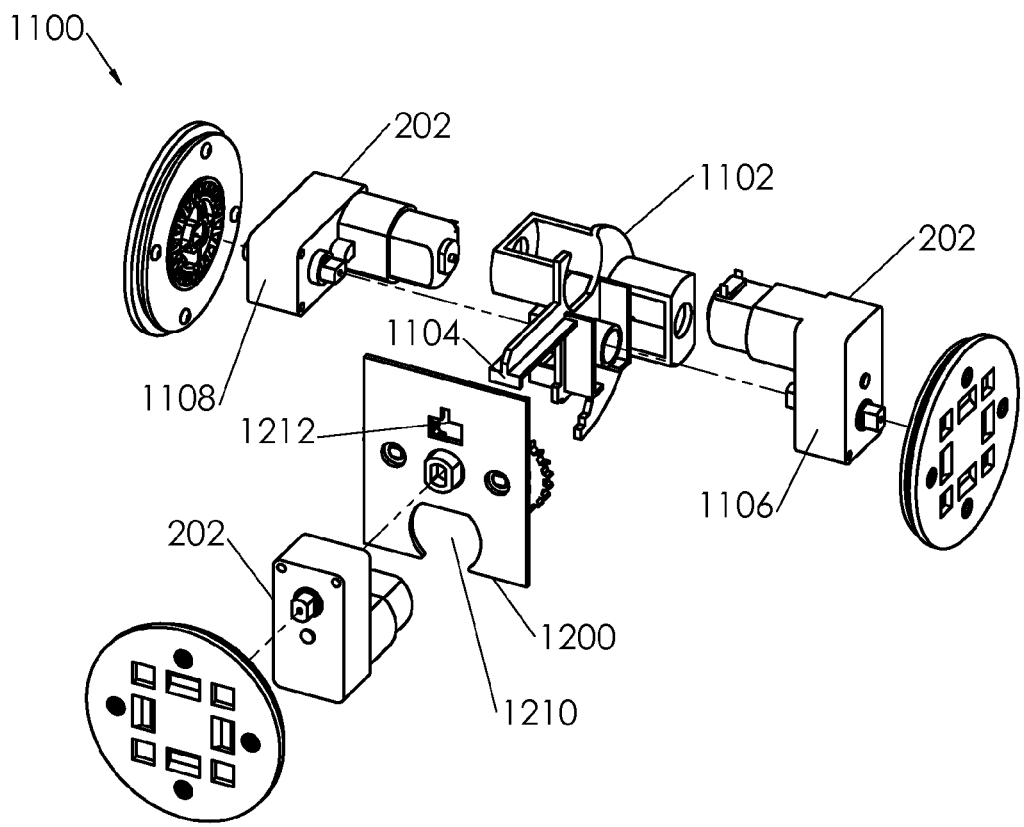
FIG. 19 is a disassembled perspective view of the drive unit of one example embodiment having three degrees of freedom.

FIG. 19 shows a disassembled view of the drive unit 1100 which has three motors 202 fastened to the carrier 1102. The controller unit 1200 fits behind the front motor and in front of the side motors. The front motor passes through slot 1210 of the board and the mounting hook 1104 of the motor carrier passes through feature 1212 of the board. The side encoder gears 304 are stabilized by the motor housing surface 1106 and 1108.

Figure 20:
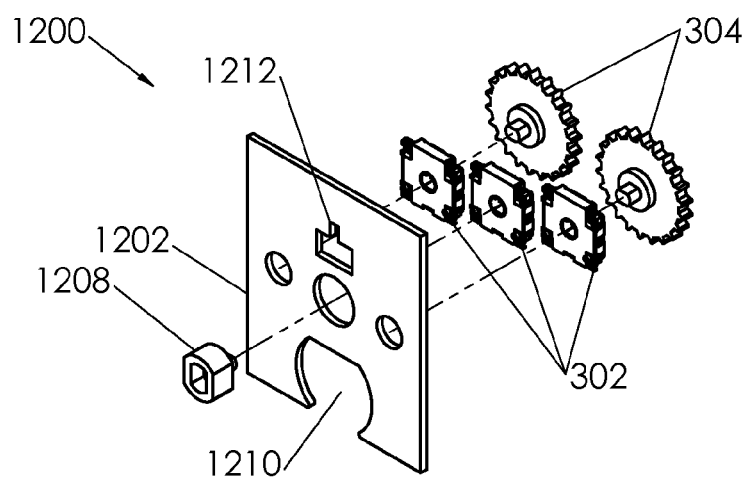
FIG. 20 is a disassembled perspective view of the control circuit of one example embodiment having three degrees of freedom.

FIG. 20 shows a disassembled view of the printed circuit board 1202 with three encoders 302. Two encoder gears 304 mount to the side encoders and interface with the encoder gear track of the hub. The encoder shaft reducer 1208 mates the rear shaft of the front motor 202 to the center encoder. In this way, it's possible to encode multiple degrees of freedom as long as the axis of rotation is perpendicular or parallel. The hole 1210 fits around the front gearmotor 202 and feature 1212 allows clearance for the front motor mounting hook 1104 to pass through.

Figure 21:
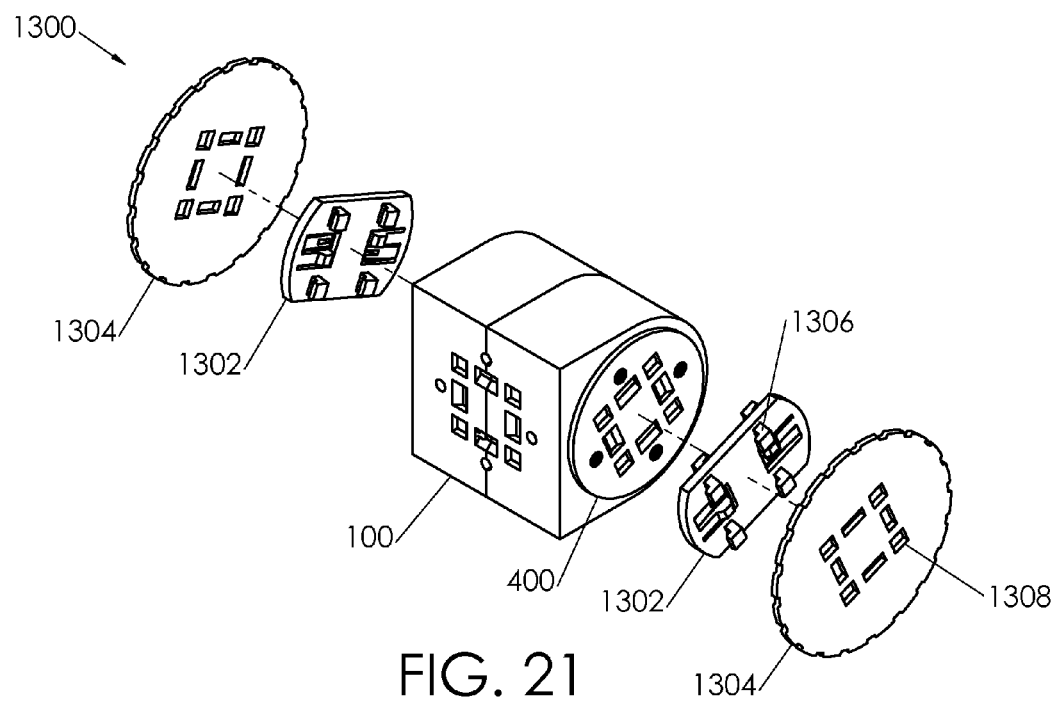
FIG. 21 is a disassembled perspective view of a robotic module having two degrees of freedom with parallel axis of rotation attached to wheels using connector plates.

FIG. 21 shows a disassembled view of the two degree of freedom module with parallel axis of rotation. The snap connector 1302 releasably fastens two wheels 1308 to the rotating hubs 400. Both hubs 100 mate with two snap connectors 1302 which have hooks 1306 and depressible detents which interface with the module's mounting features and with a wheel 1304 mounting feature 1308.

Figure 22:
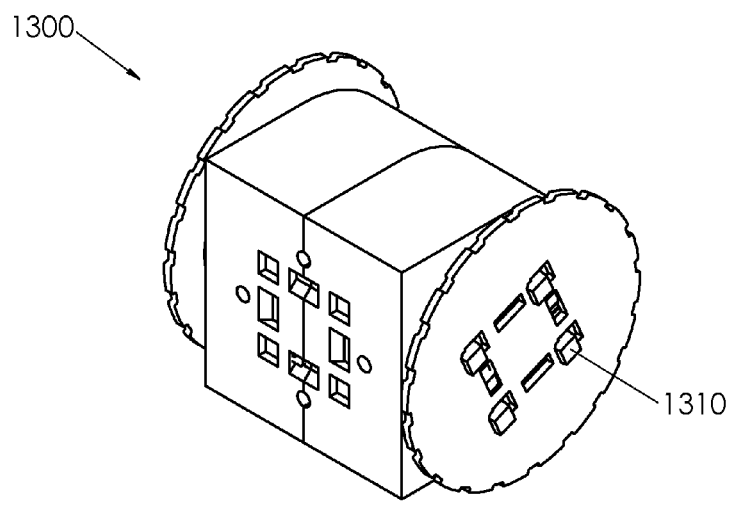
FIG. 22 is a perspective view of a robotic module having two degrees of freedom with parallel axis of rotation attached to wheels using connector plates.

FIG. 22 shows a two degree of freedom module 100 with collinear hubs with two snap connectors and two wheels. The hooks of the snap connector mate with the wheels and it can be seen that the hooks protrude through the wheel 1310.

Figure 23:
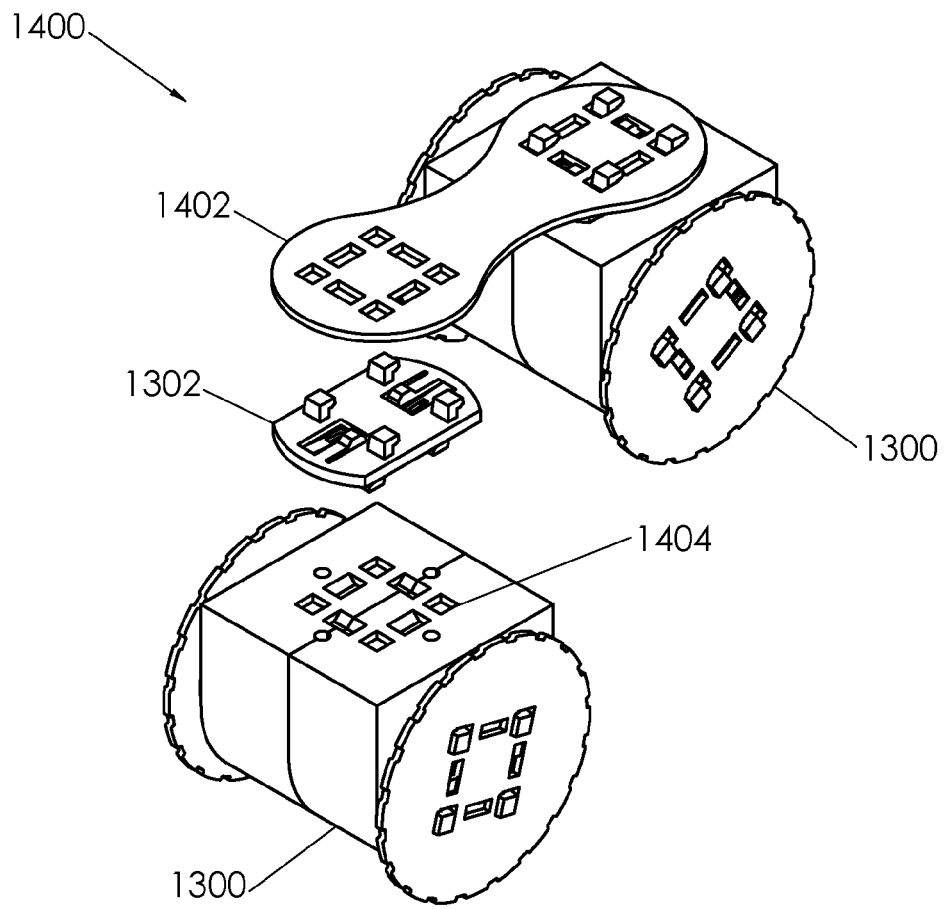
FIG. 23 is a disassembled perspective view of several robotic modules of one example embodiment having two degrees of freedom with parallel axis of rotation attached to each other and wheels using connector plates and a bridge plate.

FIG. 23 shows a four wheel drive robot made up of two 1300 assemblies. These modules are connected together using two snap connectors 1302 and a bridge plate 1402. The modules are acting like an axle for a four wheel drive car. The front mounting feature 1404 of the module does not rotate so the two modules are fixed in relationship to each other. If a three degree of freedom module was used instead it would be possible to turn the modules independently, allowing this vehicle configuration to steer. If a perpendicular axis of rotation module 500 was snapped into the front position with a parallel axis of rotation module 100 in the rear the front module 500 would only have one powered wheel, but it could rotate in reference to the bridge plate 1402 like a tricycle and steer.

Figure 24:
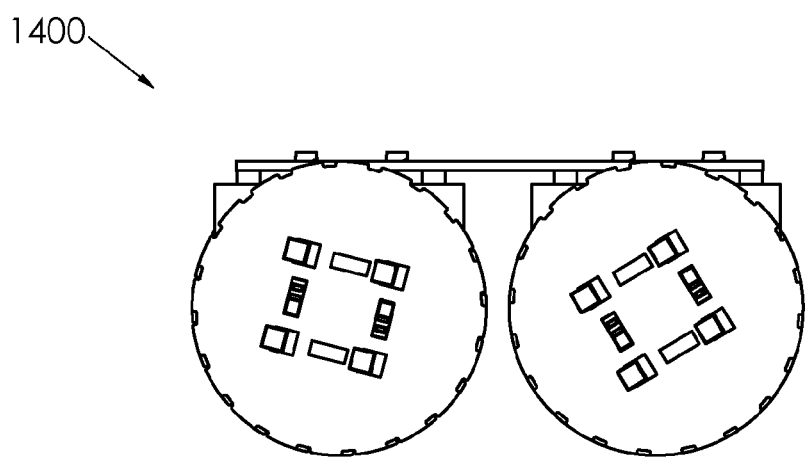
FIG. 24 is a side view of several robotic modules of one example embodiment having two degrees of freedom with parallel axis of rotation attached to each other and wheels using connector plates and a bridge plate.

FIG. 24 shows a side view of FIG. 23, showing the ground clearance of the robot.

Figure 25:
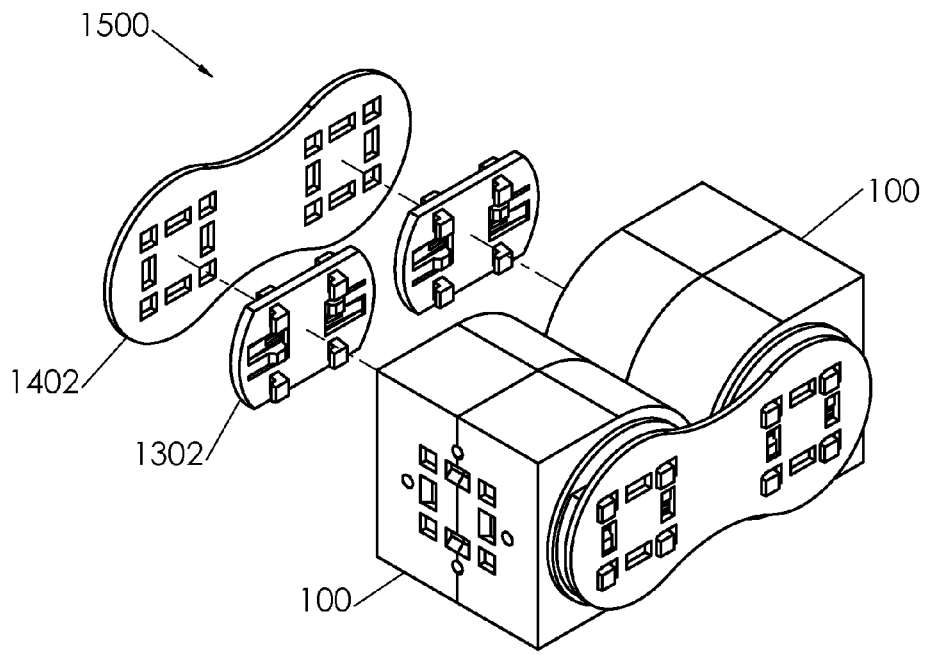
FIG. 25 is a disassembled perspective view of several robotic modules of one example embodiment having two collinear degrees of freedom attached to each other and bridge plates using connector plates.

FIG. 25 shows how a bridge plate 1402 can be used to connect modules together in conjunction with snap connectors 1302. This configuration is similar to an inchworm in the way it can move. Both hubs 400 are in parallel, which means the lifting torque is doubled, giving it more lifting torque.

Figure 26:
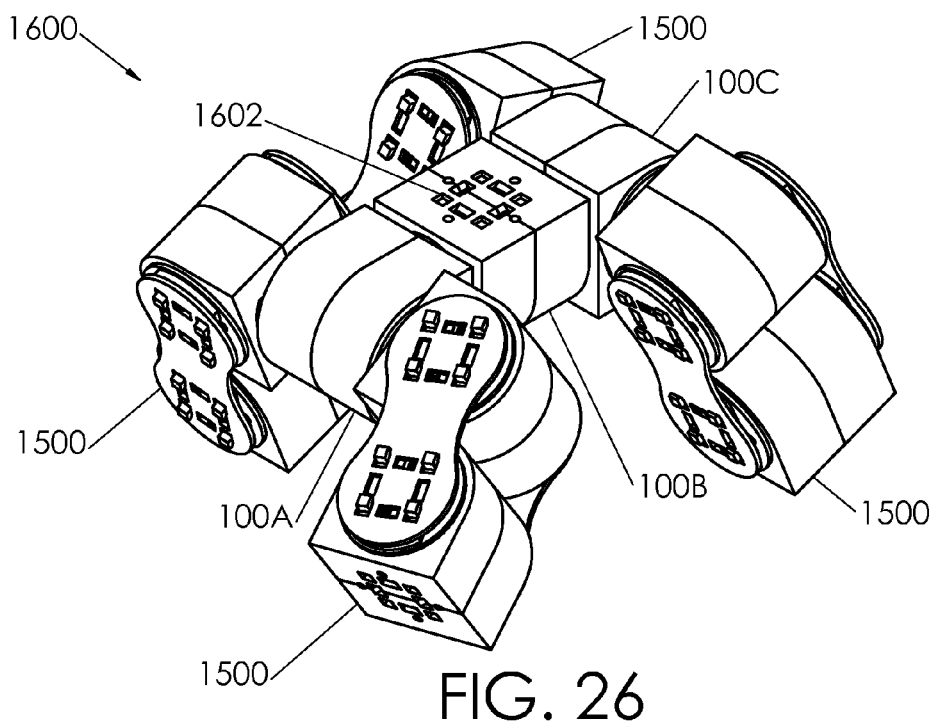
FIG. 26 is a perspective view of several robotic modules of one example embodiment having two degrees of freedom with parallel axis of rotation attached to connector plates and bridge plates to form a dog configuration.

FIG. 26 shows a dog shaped robot made out of parallel axis of rotation modules 100 assembled together using snap connectors and bridge plates. The legs of the dog are made up of assembly 1500 shown in FIG. 25. Three modules 100A, 100B, and 100C make up the body segment where 100B allows the back to twist and the hubs of 100A and 100C make up the shoulder of the dog and are connected to the fixed hub of the 1500 assemblies. The same configuration can be made using fewer perpendicular axis of rotation modules. In fact, it would require fewer modules to obtain the same movements because there's so much redundancy of collinear degrees of freedom in 1600. However, if perpendicular degree of freedom modules were used they would not have as much lifting torque for the same reason. The same configuration could be recreated using a three degree of freedom module, while increasing the complexity of movement and keeping the same high torque configuration of the legs.

Figure 27:
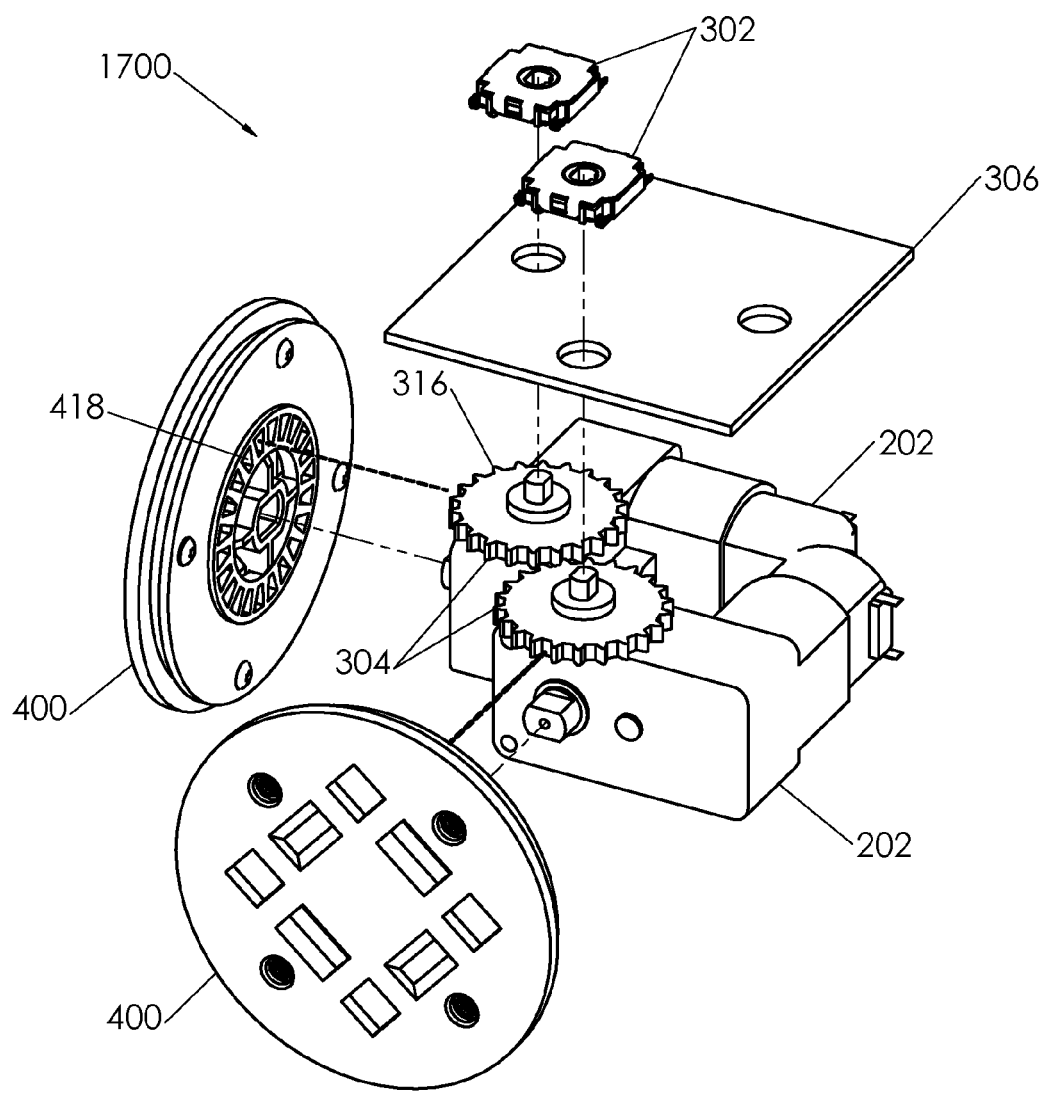
FIG. 27 is a disassembled perspective view of one example embodiment having two degrees of freedom with perpendicular axis of rotation where the hubs with encoder gear tracks, encoder gears, motors, printed circuit board and encoders which have been isolated from the rest of the module to show an encoding method.

FIG. 27 shows a disassembled view of the motor 202, hub 400, encoder gear 304, printed circuit board 306, and encoders 302 isolated from the rest of the module to show the interaction between the encoder gears 304 and the encoder gear track 418. The encoder gears are sandwiched between the gearmotor 202 and printed circuit board 306 and protrude beyond the board to engage with the encoder gear track 418 on the back of the hub 400. The encoder gear has the same number of teeth as there are female slots in the encoder gear track 418, which means when the hub rotates it is translates into an equal angular rotation of the encoder gear which drives the encoder. This is how it's possible to have absolute encoding and continuous rotation of multiple degrees of freedom in different orientations using only one printed circuit board.

Figure 28:
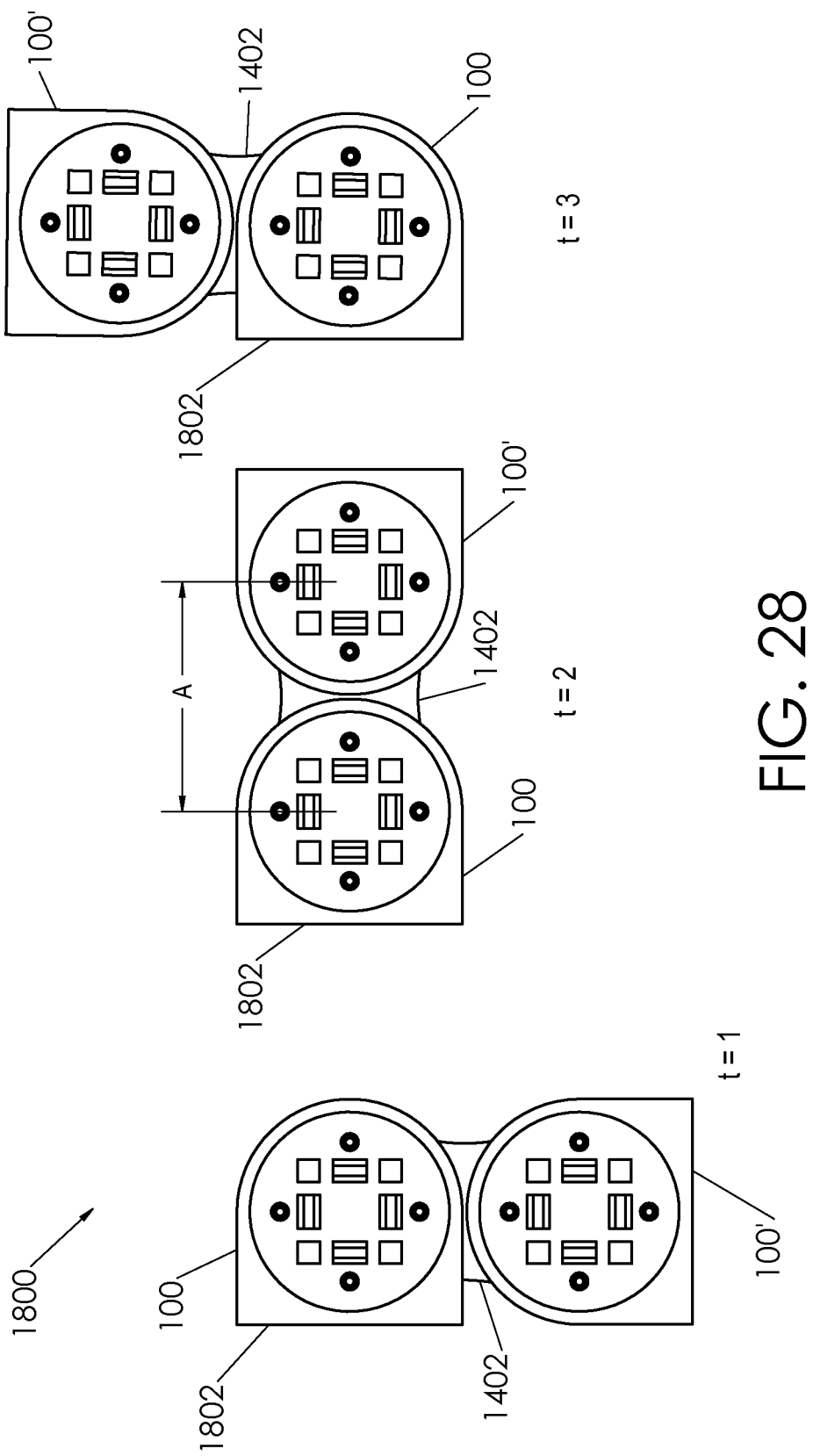
FIG. 28 is a side view of one example embodiment of a robotic module lifting another robotic module using a bridge connector.

FIG. 28 shows a serious of motions where one module lifts another module. The surface 1802 of module 100 is fixed so it can lift another module 100' using a pridge connector 1402. The D-shaped housing of the modules allow for the minimum distant between each hub, shown as distance A. The shorter distance A the shorter the lever arm when one module lifts another module, allowing it to lift a greater payload. This also applies to lifting objects on the D-shaped side of the module.

Various additional modifications of the described embodiments of the invention specifically illustrated and described herein will be apparent to those skilled in the art, particularly in light of the teachings of this invention. It is intended that the invention cover all modifications and embodiments, which fall within the spirit and scope of the invention. Thus, while preferred embodiments of the present invention have been disclosed, it will be appreciated that it is not limited thereto but may be otherwise embodied within the scope of the following claims.

I claim:

1. A robot module, the module comprising:
a housing having a first side, a second side, and a third side;
a fourth surface having a first edge in common with the first side, a second edge in common with the second side, and a third edge in common with the third side, wherein the fourth surface is curved and smooth;
a first hub configured to be rotatably connected to the first side of the housing;
a second hub configured to be rotatably connected to the second side of the housing;
a third hub configured to be rotatably connected to the third side of the housing;
a drive unit disposed within the housing, wherein the drive unit is configured to rotate the first hub, the second hub and the third hub independently of each other, and wherein the drive unit further comprises a carrier configured to hold a first motor configured to rotate the first hub and a second motor configured to rotate the second hub;

a controller unit disposed within the housing, wherein the controller unit is configured to control the drive unit to rotate the first hub, the second hub and the third hub independently of each other to provide three degrees of freedom for the module, wherein the controller unit is configured to hold a third motor connected to the third hub, and wherein the controller unit is configured to attach to the carrier.

2. The module of claim 1, wherein the carrier is configured to position the first motor to drive the first hub along a first axis of rotation, wherein the carrier is configured to position the second motor to drive the second hub along a second axis of rotation parallel to the first axis, and wherein the controller unit is configured to position the third motor to drive the third hub along a third axis of rotation perpendicular to the first and second axes.

3. The module of claim 1, wherein the controller unit comprises:
a first encoder gear configured to engage with the first hub and rotate in response to the first hub rotating;
a first encoder configured to mate with the first encoder gear;
a second encoder gear configured to engage with the second hub and rotate in response to the second hub rotating; and
a second encoder configured to mate with the second encoder gear.

4. The module of claim 3, wherein the first encoder gear is configured to rotate a first angular distance in response to the first hub rotating a second angular distance that is equal to the first angular distance, and wherein the second encoder gear is configured to rotate a third angular distance in response to the second hub rotating a fourth angular distance that is equal to the third angular distance.

5. The module of claim 3, wherein the controller unit comprises:
a printed circuit board;
wherein the first encoder is configured to provide a first signal to the printed circuit board indicative of a rotary position of the first hub, and
wherein the second encoder is configured to provide a second signal to the printed circuit board indicative of a rotary position of the second hub.

6. The module of claim 5, wherein the printed circuit board is configured to position the first and second encoders and encoder gears in a first configuration in which the first and second hubs rotate with parallel axis of rotation, and wherein the printed circuit board is configured to position the first and second encoders and encoder gears in a second configuration in which the first and second hubs rotate with perpendicular axis of rotation.

7. The module of claim 3, wherein the first hub has a first encoder track, which is concentric to the first hub and configured to engage with the first encoder gear, and wherein the second hub has a second encoder track, which is concentric to the second hub and configured to engage with the second encoder gear.

8. The module of claim 1, wherein the first hub comprises:
a front member joined with a back member; and
a recessed track around an outer circumference of the hub and disposed between the front member and the back member, wherein a portion of the first side of the housing is positioned in the recessed track and between the front member and the back member.

9. The module of claim 8, wherein the front member has one or more mounting features configured to mate with a connector plate.

10. The module of claim 8, wherein the back member has an encoder track configured to mate with an encoder gear of the controller unit.

11. The module of claim 1, wherein the first side is opposite to the second side, and wherein the first hub is configured to rotate with respect to a first axis and the second hub is configured to rotate with respect to a second axis that is parallel to the first axis.

12. The module of claim 1, wherein the first side is perpendicular to the third side, and wherein the first hub is configured to rotate with respect to a first axis and the third hub is configured to rotate with respect to a third axis that is perpendicular to the first axis.

13. The module of claim 1, wherein the housing is configured to position the first hub at a fixed angle with respect to the second hub.

14. The module of claim 1, wherein the first hub and the second hub are configured to rotate continuously in a clockwise or counter clockwise direction with respect to a center axis of the first hub and a center axis of the second hub, respectively.

15. The module of claim 1,
wherein the third hub has one or more mounting features configured to mate with a connector plate, and wherein the first side is opposite the second side and the third side is perpendicular to the first side and the second side.

16. The module of claim 1,
wherein the third hub has one or more mounting features configured to mate with a connector plate, and wherein the first side is opposite the third side and the second side is perpendicular to the first side and the third side.

17. The module of claim 1, wherein the module is D-shaped.

18. A method of making a reconfigurable robot module, the method comprising:
obtaining a housing having a first side, a second side, a third side, and a fourth surface having a first edge common with the first side, a second edge common with the second side, and a third edge common with the third side, wherein the fourth surface is curved and smooth;
obtaining a first hub;
rotatably connecting the first hub to the first side of the housing;
obtaining a second hub;
rotatably connecting the second hub to the second side of the housing;
obtaining a third hub;
rotatably connecting the third hub to the third side of the housing;
obtaining a drive unit;
disposing the drive unit within the housing, wherein the drive unit is configured to rotate the first hub, the second hub, and the third hub independently of each other, and wherein the drive unit further comprises a carrier configured to hold a first motor configured to rotate the first hub and a second motor configured to rotate the second hub;
obtaining a controller unit; and
disposing the controller unit within the housing, wherein the controller unit is configured to control the drive unit to rotate the first hub, the second hub, and the third hub independently of each other to provide three degrees of freedom for the module, wherein the controller unit is configured to hold a third motor connected to the third hub, and wherein the controller unit is configured to attach to the carrier.

19. The method of claim 18, wherein the carrier is configured to position the first motor to drive the first hub along a first axis of rotation, wherein the carrier is configured to position the second motor to drive the second hub along a second axis of rotation parallel to the first axis, and wherein the controller unit is configured to position the third motor to drive the third hub along a third axis of rotation perpendicular to the first and second axes.

20. The method of claim 18, wherein the controller unit comprises:
    a first encoder mated to a first encoder gear; and
    a second encoder mated to a second encoder gear, wherein the method further comprises:
        engaging the first encoder gear with a first encoder track of the first hub; and
        engaging the second encoder gear with a second encoder track of the second hub,
    wherein the first encoder gear is configured to rotate in response to the first hub rotating and the second encoder gear is configured to rotate in response to the second hub rotating.

21. The method of claim 20, wherein the controller unit further comprises:
    a printed circuit board, wherein the first encoder is configured to provide a first signal to the printed circuit board indicative of a rotary position of the first hub, and wherein the second encoder is configured to provide a second signal to the printed circuit board indicative of a rotary position of the second hub.

22. The method of claim 21, wherein the printed circuit board is configured to position the first and second encoders and encoder gears in a first configuration in which the first and second hubs rotate with parallel axis of rotation, and wherein the printed circuit board is configured to position the first and second encoders and encoder gears in a second configuration in which the first and second hubs rotate with perpendicular axis of rotation.

23. The method of claim 18, wherein the first side is opposite to the second side, wherein the drive unit is configured to rotate the first hub with respect to a first axis, and wherein the drive unit is configured to rotate the second hub with respect to a second axis that is parallel to the first axis.

24. The method of claim 18, wherein the first side is perpendicular to the third side, wherein the drive unit is configured to rotate the first hub with respect to a first axis, and wherein the drive unit is configured to rotate the third hub with respect to a third axis that is perpendicular to the first axis.

25. The method of claim 18,
    wherein the third hub is fixed with respect to the housing, and wherein the third hub has one or more mounting features configured to mate with a connector plate.

* * * * *